UNITED STATES PATENT OFFICE.

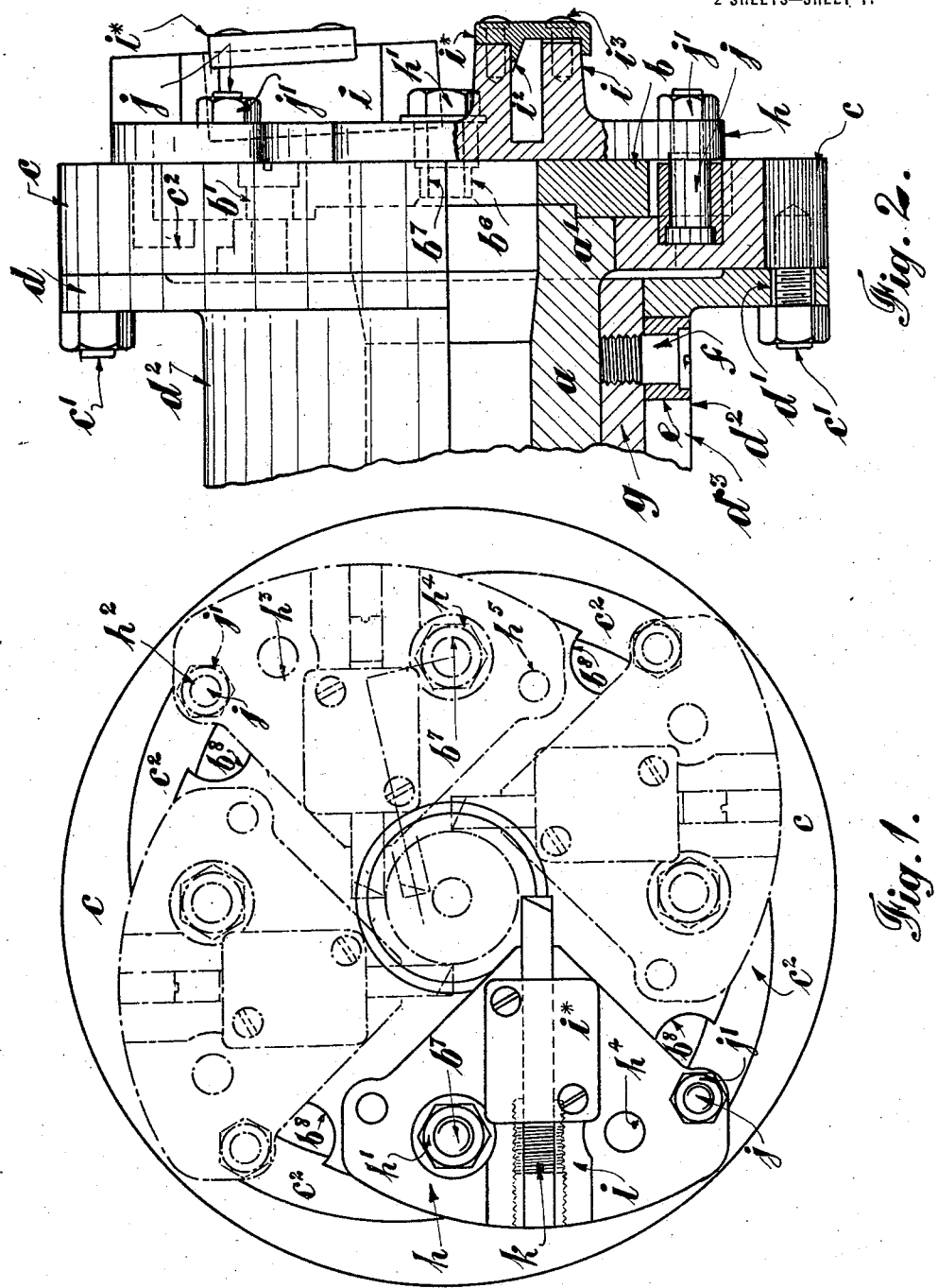

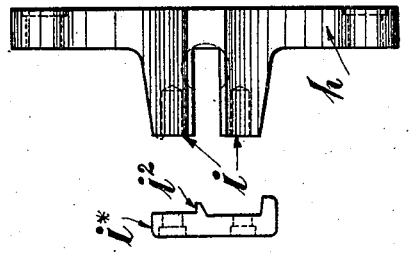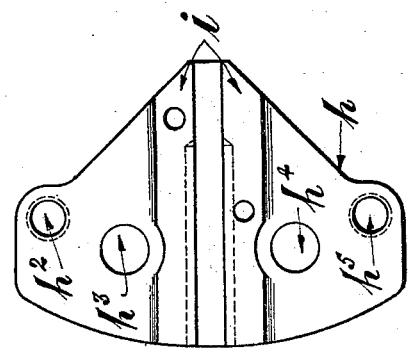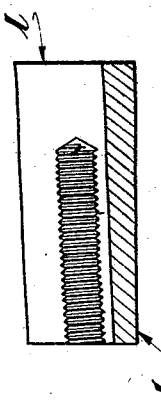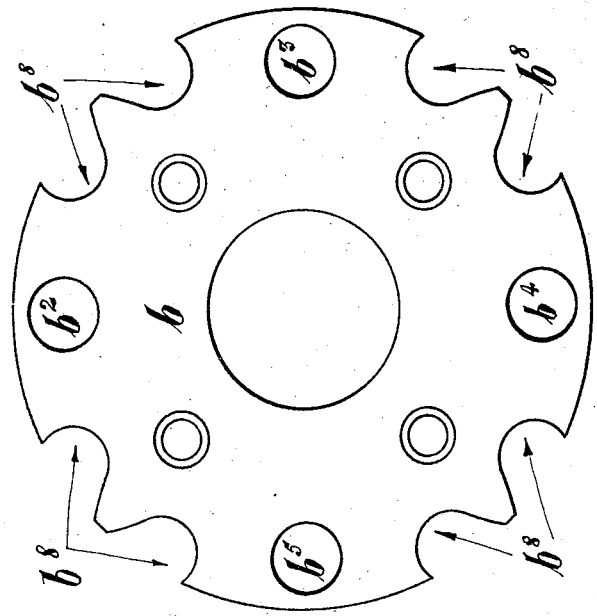

CLAUDE WILLIAM HARRIS, OF LEVENSHULME, MANCHESTER, ENGLAND.

DIE HEAD OF SCREW-CUTTING MACHINES.

1,417,601.

Specification of Letters Patent.   Patented May 30, 1922.

Application filed April 17, 1920.   Serial No. 374,775.

*To all whom it may concern:*

Be it known that I, CLAUDE WILLIAM HARRIS, a subject of the King of Great Britain and Ireland, and resident of Levenshulme, Manchester, England, have invented certain new and useful Improvements in the Die Heads of Screw-Cutting Machines, of which the following is a specification.

These improvements refer to the die heads of screw-cutting machines and relate, in particular, to die heads of the kind comprising a rotary head part and a series of pivoted holders, each of such holders being adapted to hold a die or chaser, and each being movable about its pivot so as to allow the cutting end of the chaser to approach or recede from the "work" in the arc of a circle. In such construction of die head, the holders used for holding the chasers for cutting a right hand thread are not adapted for use in holding the chasers for cutting a left hand thread, and therefore two sets of holders are necessary.

These improvements have for their object, and consist primarily in providing a die head in which one set of holders serve for both right and left hand threads.

A further object and feature of the improvements is a compact and simple construction of die head as a whole, including means for readily adjusting the dies to and from the work.

Upon the accompanying drawings,

Fig. 1 illustrates a face or end view, and

Fig. 2 a part longitudinal section and part side exterior elevation of a die-head constructed according to the present invention.

Fig. 3 illustrates a face view of the die carrier alone.

Fig. 4 illustrates a face view.

Fig. 5 an edge view, and

Fig. 6 a longitudinal section of one of the die-holders separate from the die head.

As shown, the improved die-head comprises the usual hollow shaft $a$ to the flanged end $a'$ of which is bolted the die-carrier plate $b$, see Fig. 3, by stud bolts $b'$ see Fig. 2. Rotatably surrounding the said flange $a'$ and die-carrier plate $b$ is the cam ring $c$, which is adjustably connected by stud bolts $c'$ to the back plate $d$, this latter being formed with slots $d'$ for the angular adjustment of the cam ring relatively to the plate $d$. In one with the plate $d$ is the tubular part $d^2$ having cam slots $d^3$ on diametrically opposite sides into which project rollers $e$ on studs $f$, carried by the endwise movable sleeve $g$.

In the die-carrier plate $b$ are four holes $b^2$, $b^3$, $b^4$, $b^5$ and in each of such holes is arranged a tightly-fitting bush $b^6$ see Fig. 2. Within each bush is mounted a stud bolt $b^7$ which projects beyond the face of the die carrier plate. Upon the projecting part of each bolt is mounted one of the die-holder plates $h$, a nut $h'$ serving to hold the plate on the bolt.

As aforesaid, each die-holder plate $h$ is of substantially triangular shape in outline, see Fig. 1, and in one with said plate is a die-holder $i$, said holder being formed by two projecting flanges, see Figs. 4 and 5, producing between them an open-ended slot or recess for the reception of the die-chaser, which is held in the slot or recess by a cover $i^*$, see Fig. 2. Usually the chaser will be bevelled on its rear face and along one edge and engaging such bevelled part will be a wedge-like rib $i^2$ on the cover, which will serve to firmly hold the chaser in position when the cover is tightened up by the set screw $i^3$.

As shown in Figs. 1 and 4, each die-holder $h$ has four holes $h^2$, $h^3$, $h^4$ and $h^5$. By means of the hole $h^3$ or $h^4$ the plate is adapted to fit one of the stud bolts $b^7$ of the carrier plate $b$.

For cutting a right hand thread the hole $h^3$ in each die holder plate will be caused to engage one of the stud bolts $b^7$ whilst for cutting a left hand thread the hole $h^4$ will be caused to engage said stud bolt. In each case the die-holder will serve to hold the chaser at a tangent to the periphery of the work to be screw threaded. In one or other of the other holes $h^2$, $h^5$ is fitted a stud $j$ which is held to the plate by a nut $j'$ and which, behind the plate, carries a bowl or runner designed to lie in the groove $c^2$ of the cam ring $c$.

The flange forming each die holder $i$ is screw threaded to receive the screw $k$ for following up the chaser as it wears away, and for holding it firmly to the work.

The chasers are composed of bars of steel grooved on one face to form the chaser teeth.

With the holes $h^3$, $h^4$ for the stud on the die-carrier lying to right and left of the longitudinal axis of the die-holder, said axis, even with the smallest diameter of work, will lie considerably out of parallel with a line drawn through the centre of the work and the centre of the stud about which the die-holder and plate move when being adjusted to the work, thereby preventing any tendency of the chaser to "pluck" or pinch the work.

To allow of the stud (and bowl) $j$ of each die-holder plate moving in the arc of a circle about the stud bolt $b^7$ when the cam ring $c$ is adjusted to move the die-chasers into and out of contact with the work, the die-carrier plate $b$ is formed on its periphery with recesses $b^8$, see Fig. 3, the bowl passing into one or other of such recesses on the cam ring rotating to move the chaser $i$ to contact with work of small diameter.

The operation of the device will be as follows: The bar or work to be screw threaded is held in a work holder so as to be incapable of rotation and said work is advanced to the cutter head. Assuming the die holders $i$ to be set for cutting a right hand thread, i. e.: the holes $h^3$ engaging the studs $b^7$ and the studs $j'$ in the holes $h^5$ with the bowls thereon lying in the slots in the cam plate $c$. The tubular sleeve $g$ is then moved horizontally by any convenient means (not shown). During this movement the bowl $e$ slides in the inclined slot $d^3$ and imparts a part rotary movement to the cam ring $c$, the slots $c^2$ in which are so shaped as to cause the die holders to converge with the cutters in the operative position. A reverse movement of the tubular sleeve $g$ causes the cutter to diverge in a manner which will be obvious from the foregoing description.

What I claim is:—

1. A rotary die head suitable for cutting both right and left hand screw threads comprising a hollow spindle, a holder carrier plate rigidly attached to the spindle, a series of die holders each formed with two pivot bearings to right and left of the tool respectively, a stud to connect each die holder to the holder carrier, a slotted cam ring rotatably mounted on the spindle, a projection at the rear of each die holder capable of being attached to one of two positions thereon and means to impart rotary movement to the cam ring, the arrangement being such that each die holder can be swivelled to positions to right and left of a line drawn through the axis of the die head and the pivot of the holder, and each also adapted to hold a die or chaser and allow of such die or chaser being reversed, substantially as herein set forth.

2. In die-heads of screw-cutting machines and of the kind herein referred to, a die-holder mounted upon a plate and said plate adapted to be pivotally mounted upon the die-carrier, a cam ring rotatably mounted relatively to the die carrier the arrangement being such that the die-holder and plate serve to carry the chaser, and, in conjunction with the cam ring, also serve to move the chaser into contact with the work and to withdraw the chaser when the screwing operation is complete, substantially as herein set forth.

3. In die-heads of screw-cutting machines and of the kind herein referred to, a series of die-holders each in one with a plate of substantially triangular outline, and each plate having two holes whereby it may be pivotally mounted by one or the other of such holes on one of a series of studs on the die-carrier plate, said holes lying respectively to right and left of the die-holder, and said die-holder and die-holder plate having two further holes to either of which a stud and bowl may be fitted and a grooved cam ring, said bowl lying in the groove of the cam ring, substantially as and for the purpose herein set forth.

In witness whereof I have hereunto set my hand in the presence of a witness.

CLAUDE WILLIAM HARRIS.

Witness:
Hy. Junca.